United States Patent
Johnson et al.

(10) Patent No.: US 8,302,098 B2
(45) Date of Patent: Oct. 30, 2012

(54) HARDWARE UTILIZATION-AWARE THREAD MANAGEMENT IN MULTITHREADED COMPUTER SYSTEMS

(75) Inventors: Darrin Paul Johnson, San Jose, CA (US); Eric Christopher Saxe, Livermore, CA (US); Bart Smaalders, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1140 days.

(21) Appl. No.: 11/952,037

(22) Filed: Dec. 6, 2007

(65) Prior Publication Data
US 2009/0150893 A1     Jun. 11, 2009

(51) Int. Cl.
*G06F 9/46* (2006.01)
*G06F 1/00* (2006.01)
*G06F 1/32* (2006.01)

(52) U.S. Cl. ........ 718/102; 718/100; 718/101; 718/104; 718/105; 713/300; 713/320; 713/322; 713/323

(58) Field of Classification Search ........................ None
See application file for complete search history.

(56) References Cited

U.S. PATENT DOCUMENTS

| | | | |
|---|---|---|---|
| 5,070,475 A | 12/1991 | Normoyle et al. | |
| 5,913,068 A * | 6/1999 | Matoba | 713/322 |
| 6,711,447 B1 * | 3/2004 | Saeed | 700/82 |
| 7,093,147 B2 * | 8/2006 | Farkas et al. | 713/320 |
| 7,146,514 B2 * | 12/2006 | Kaushik et al. | 713/322 |
| 7,437,581 B2 * | 10/2008 | Grochowski et al. | 713/320 |
| 7,461,275 B2 * | 12/2008 | Belmont et al. | 713/300 |
| 7,596,705 B2 * | 9/2009 | Kim | 713/300 |
| 7,702,938 B2 * | 4/2010 | Ha | 713/323 |
| 2004/0111594 A1 | 6/2004 | Feiste et al. | |
| 2005/0044429 A1 * | 2/2005 | Gaskins et al. | 713/300 |
| 2005/0050373 A1 * | 3/2005 | Orenstien et al. | 713/320 |
| 2005/0066079 A1 * | 3/2005 | Luick | 710/36 |
| 2006/0020831 A1 | 1/2006 | Golla et al. | |
| 2006/0136915 A1 | 6/2006 | Aingaran et al. | |
| 2006/0136919 A1 | 6/2006 | Aingaran et al. | |
| 2007/0043912 A1 | 2/2007 | Hetherington et al. | |
| 2007/0061548 A1 | 3/2007 | Jordan et al. | |
| 2009/0007120 A1 * | 1/2009 | Fenger et al. | 718/102 |
| 2011/0126200 A1 * | 5/2011 | Krieger et al. | 718/102 |

OTHER PUBLICATIONS

Laudon, James, "Threading the UltraSPARC T1," web.archive.org/web/20100923125932/blogs.sun.com/jlaudon#threading_the_t1, originally posted on Dec. 6, 2005 (2 pages).
Nawathe, Umesh Gajanan et al., "An 8-core, 64-thread, 64-bit, Power Efficient SPARC SoC (Niagara2)," Powerpoint Presentation, Sun Mircosystems Inc., Sunnyvale, CA, Feb. 11, 2007 (25 pages).

(Continued)

*Primary Examiner* — Meng An
*Assistant Examiner* — Bing Zhao
(74) *Attorney, Agent, or Firm* — Osha Liang LLP (57) ABSTRACT

A device, system, and method are directed towards managing threads in a computer system with one or more processing units, each processing unit having a corresponding hardware resource. Threads are characterized based on their use or requirements for access to the hardware resource. The threads are distributed among the processing units in a configuration that leaves at least one processing unit with threads that have an aggregate zero or low usage of the hardware resource. Power may be reduced or turned off to the instances of the hardware resource that have zero or low usage. Distribution may be based on one or more of a number of specifications or factors, such as user power management specifications, power usage, performance, and other factors.

12 Claims, 7 Drawing Sheets

OTHER PUBLICATIONS

Fedorova, Alexandra, "System Software Design for Chip Multithreaded Precessors," CMPT 886 Special Topics in Operating Systems: Lecture 1, Course Overview and Introduction, Simon Fraser University, Spring 2007 (41 pages).

Kongetirz, Poonacha et al., "Niagara: 32-Way Multithreaded SPARC Processor," IEEE Micro, Mar.-Apr. 2005 (9 pages).

Meswani, M. et al., "Evaluating the Performance Impact of Hardware Thread Priorities in Simultaneous Multithreaded Precessors using SPEC CPU2000," OSIHPA, 2006 (7 pages).

Spracklen, L. et al., "Chip Multithreading: Opportunities and Challenges" Proceedings of the 11th International Symposium on High-Performance Computer Architecture (HPCA-11), Feb. 2005 (5 pages).

"UltraSPRAC IV Processor Architecture Overview," white paper, Sun Microsystems, Inc. Feb. 2004 (10 pages).

Hicks, T.N. et al., "POWER2 Floating-point Unit: Architecture and Implementation," IBM J. Res. Develop., vol. 38, No. 5, Sep. 1994 (12 pages).

* cited by examiner

HARDWARE UTILIZATION-AWARE THREAD MANAGEMENT IN MULTITHREADED COMPUTER SYSTEMS

FIELD OF THE INVENTION

The present invention relates generally to computer systems and, more particularly, but not exclusively to managing threads in multithreaded computer systems.

BACKGROUND OF THE INVENTION

Though processors on computer systems operate at high speeds, they may perform inefficiently due to delays, such as those that occur while waiting to access memory. Fast cache memory is one way to reduce these delays, but a cache miss, which occurs when a desired block of memory is not in the cache and must be retrieved from external caches or memory, causes CPU idling, resulting in execution delay.

One technique for reducing processor idling is the use of hardware multithreading to achieve processor execution during otherwise idle cycles. In a multithreaded processor, two or more threads of execution may concurrently exist on the processor. Hardware multithreading may employ the replication of registers for each thread in order to minimize the overhead of switching between threads. This technique is called "vertical multithreading."

In vertical multithreading, a group of two or more threads may each have their own registers, while functional units, such as an execution unit, are shared. Threads are alternately selected to execute. In course-grained multithreading, a thread may use a functional unit until it stalls, such as upon a memory access. At that point, another thread is selected to execute. A context switch from the first thread to the second thread may involve saving the useful states of the first thread and assigning new states to the second thread. When the first thread restarts after stalling, the saved states are returned and the first thread proceeds. In fine grained multithreading, a thread may be selected to execute at a cycle boundary. In horizontal multithreading, a group of threads share a pipeline, and different threads may be scheduled on different functional units of the pipeline at the same time. Multiple threads may execute simultaneously, as long as there is no conflict for a shared resource.

In a processor configured for chip multiprocessing (CMT), two or more cores exist on the same processor chip. While each core may have a first level cache, the cores may share a second level cache. Threads from a first core execute independently of threads from a second core, though they may interact through shared memory, including the second level cache. A processor may combine chip multiprocessing and hardware multithreading, having two or more multithreaded cores on a single processor.

Computer system processors consume a significant amount of power. High power consumption can generate large amounts of heat. Mechanisms for dissipating heat can require additional power consumption. The consumption of power, as well as the generation and dissipation of heat can adversely affect computer systems in a number of ways, such as reduction of battery life, wear on components, operational costs, and the like. Increases in complexity and number of components in processors tend to exacerbate problems of power consumption and management of power usage. In multithreaded computer systems, problems related to power consumption may be further exacerbated, due to the maximized use of processors and components.

Generally, it is desirable to employ improved techniques for managing power usage in a computer system, and in particular a multithreaded computer system. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processing unit" may refer to a processor or a processor core.

As used herein, the term "proper subset" refers to a non-empty subset that contains less elements than the entire set. If A is a proper subset of B, B contains at least one member that is not in A.

As used herein, the term "coalescing threads" onto a set of processing units refers to an action of distributing, assigning, or moving threads in a way that combines them into a target set of processing units, where the target set is a proper subset of a larger set of available units, and where the coalescing is an intentional action.

As used herein, the term "hardware resource" (HR) refers to a hardware component or class of hardware components that is limited in its availability. Generally a hardware resource may be allocated by a controlling mechanism, such as an operating system kernel. A floating point unit is an example of a hardware resource. As used herein, the term "instance" of a hardware resource refers to a specific component of the class of hardware resource referred to. Different instances of a hardware resource may be, but are not necessarily, identical.

Briefly stated, the present invention is directed toward a computer-based mechanism for managing threads in a computer system having multiple processing units. One embodiment of a computer system in which the invention may be deployed is a system having a processor with multiple multithreaded cores, in which each core has a corresponding instance of a hardware resource. Mechanisms of the invention may include dividing the processing units into two groups in such a way that threads using the hardware resource are assigned to a first group, the remaining threads are distributed over all processing units, and power is reduced or turned off to the second group of processing units. Mechanisms of the invention may include monitoring threads that are executing on the system to determine characteristics such as the amount of the hardware resource used by the thread, and selectively coalescing the threads onto a proper subset of the cores, based on the hardware resource usage of each thread. In some embodiments, the hardware resource is a floating point unit, and the hardware resource usage is the usage of the floating point unit by each thread. In one embodiment, the hardware resource may be cache memory, and the hardware resource usage is the amount of cache memory used by each thread. In one embodiment, the hardware resource may be a data bandwidth for accessing memory or another component, and the hardware component indicates an amount of bandwidth used by each thread.

Mechanisms of the invention may further include using a hardware component, such as a performance counter, to count instructions that use the hardware resource, or to otherwise measure a usage of the hardware resource by each thread.

Mechanisms of the invention may further include reducing or turning off power to, or lowering a frequency of, each hardware resource instance corresponding to a processing unit that is not in the proper subset of the processing units.

Mechanisms of the invention may further include one or more of a number of specifications or factors that may be considered when determining the number of processing units to include in the proper subset. These may include one or more of a user specification of power management preferences, a system default specification, a capacity of each instance of the hardware resource, thread priorities, component temperatures, power usage, or other factors.

Illustrative Operating Environment

Figure 1:
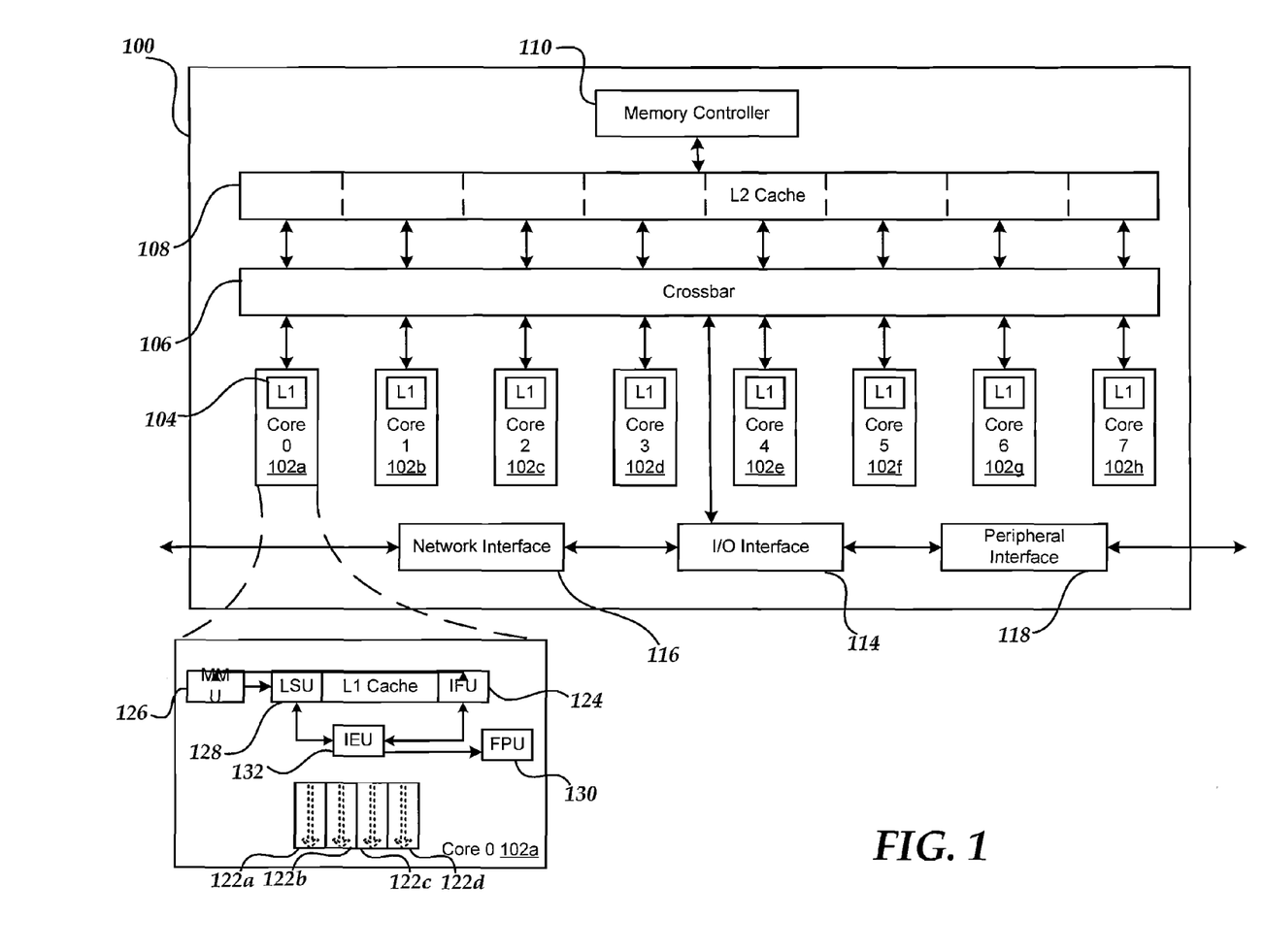
FIG. 1 is a block diagram illustrating one embodiment of a multiple core, multithreaded processor.

FIG. 1 shows one embodiment of a processor chip 100 having multiple processor cores, each core configured to be hardware multithreaded, in accordance with one embodiment of the invention. The embodiment of processor chip 100 illustrated in FIG. 1 may be used to implement all, or a portion of, methods of the present invention and associated methods. Processor chip 100 may include many more components than those shown. It may also have less than all of those shown. The components shown, however, are sufficient to disclose an illustrative embodiment for practicing the invention. One or more processor chips, and software instructions described herein, may be used to implement various embodiments of methods of the present invention.

As illustrated, processor chip 100 includes multiple processor cores 102a-h, which are also designated "Core 0" through "Core 7," respectively. Each of cores 102a-h connects to a corresponding first level (L1) cache 104, which holds recently or frequently used data or instructions for expedited retrieval by the core. Each of cores 102a-h is coupled to a level 2 (L2) cache 108 by a crossbar 106. L2 cache 108 is coupled to one or more memory controllers 110, which are coupled in turn to one or more banks of system memory (not shown). Additionally, crossbar 106 couples cores 102a-h to input/output (I/O) interface 114, which is in turn coupled to a network interface 116 and a peripheral interface 118. I/O interface 114, peripheral interface 118, and network interface 116 may couple processor 100 to boot and/or service devices, peripheral devices, and a network, respectively.

Cores 102a-h may be configured to execute instructions and to process data according to a particular instruction set architecture (ISA). In one embodiment, the cores 102a-h may be configured to implement the SPARC V9 ISA, although in other embodiments any desired ISA may be employed, such as x86, PowerPC, or MIPS. In one embodiment, the UltraSPARC processor core design may be employed. The processor core may be found in many forms, including the 64-bit SPARC RISC microprocessor from Sun Microsystems, or other 32-bit or 64 bit microprocessors by other manufacturers. Virtually any suitable microprocessors, microcontrollers, or microcomputers may be utilized. In the illustrated embodiment, each of cores 102a-h may be configured to operate independently of the others, such that each of the cores 102a-h, or a portion thereof, may execute in parallel.

Each of cores 102a-h may be configured to execute multiple threads concurrently, where a given thread may include a set of instructions that can execute independently of instructions from another thread. For example, a software process or application may include one or more threads such that each thread is scheduled to execute on one of the cores 102a-h. Multiple threads of a software process or application may execute on the same core, different cores, or a combination thereof. Cores 102a-h are referred to as a multithreaded core. As illustrated by the exploded view of core 102a, core 102a includes four threads, logically represented as threads 122a-d. FIG. 1 further illustrates core 102a coupled with a floating point unit (FPU) 130. In one embodiment, each core is coupled to a corresponding FPU. For example, processor chip 100 may have eight FPUs, one coupled to each corresponding core.

FPU 130 may be configured to execute and provide results for certain floating-point instructions. In one embodiment, FPU may be configured to execute certain graphics oriented instructions. In one embodiment, FPU 130 may implement single and double-precision floating-point arithmetic instructions compliant with the IEEE 754 floating-point standard, such as add, subtract, multiply, divide, and certain transcendental functions. In one embodiment, FPU 130 may implement partitioned-arithmetic and graphics-oriented instructions defined by a version of the SPARC Visual Instruction Set architecture. In one embodiment, FPU 130 may be configured to store floating-point register state information for each thread in a floating-point register. In various embodiments, FPU 130 may be fully pipelined (i.e. FPU 130 may be capable of starting one new instruction per execution cycle), partially pipelined, or may block issue until complete, depending on the instruction type. For example, in one embodiment floating-point add operations may be fully pipelined, while floating-point divide operations may block other divide or square root operations until completed.

One aspect of the present invention is concerned with power efficiency of a hardware resource. The hardware resource may be a component, or set of components, that is used to execute instructions of threads. In one embodiment, an FPU, such as FPU 130, may be the hardware resource. In some embodiments, the hardware resource may be a graphics processor, a digital signal processor, or other hardware resource that consumes power.

Each of the cores 102a-h may also have a replication of registers (not shown) for each thread, in order to minimize the overhead of switching between threads. The example core 102a further includes an instruction fetch unit (IFU) 124 that is coupled to a memory management unit (MMU) 126, a load store unit (LSU) 128, an L1 cache 104, and at least one integer execution unit (IEU) 132. Though not illustrated in FIG. 1, in various configurations, core 102a may include, one, two, or more IEUs. Each IEU 132 is also coupled to the LSU 128, which is coupled to send data back to each integer execution unit (IEU) 132. Additionally, the LSU 128, IFU 124, and MMU 126 are coupled, through an interface, to the crossbar 106. The four threads 122a-d of core 102a may share an execution pipeline.

The crossbar 106 may include logic that allows any core 102a-h to access any bank of L2 cache 108, and that conversely allows data to be returned from any L2 bank to any core. Crossbar 106 may be configured to concurrently process data requests from cores 1002a-h to L2 cache 108 as well as data responses from L2 cache 108 to cores 102a-h. Crossbar 106 may also include logic to queue data requests or responses, such that requests and responses need not block other activity while waiting for service. Additionally, crossbar 106 may be configured to arbitrate conflicts that may occur when multiple cores attempt to access a single bank of L2 cache 108 or vice versa. Thus, the multiple processor cores 102a-h share a second level (L2) cache 108 through the crossbar 106.

L2 cache 108 may be configured to cache instructions and data for use by cores 102a-h. In the illustrated embodiment, L2 cache 108 may be organized into eight separately addressable banks that may each be independently accessed, such that in the absence of conflicts, each bank may concurrently return data to a respective core.

In some embodiments, each processor core 102a-h shares L2 cache 108 to speed memory access and to reduce delays imposed by accessing remote memory subsystems. Cache memory may include one or more levels of dedicated high-speed memory holding recently accessed data, designed to speed up subsequent access to the same data. When data is read from main memory (e.g. through memory controller 110, a copy is also saved in the L2 cache 108, and an L2 tag array stores an index to the associated main memory. The L2 cache 108 then monitors subsequent requests for data to determine if the information needed has already been stored in the L2 cache. If the requested data is present in the L2 cache, the data is retrieved from the L2 cache and delivered to the processor core 102a-h; thus, fetching the information from main memory is not needed. If the data is not present in the L2 cache, the data is fetched from main memory and a copy of the data and its address is stored in the L2 cache 108 for future access.

In some embodiments, L2 cache 108 may implement queues for requests arriving from, and results to be sent to, crossbar 106. In some embodiments, L2 cache 108 may implement a fill buffer configured to store fill data arriving from memory controller 110, a writeback buffer configured to store dirty evicted data to be written to memory, or a miss buffer configured to store L2 cache accesses that cannot be processed as simple cache hits. L2 cache 108 may be implemented as single-ported or multiported (i.e. capable of processing multiple concurrent read or write accesses). Additionally, L2 cache 108 may implement arbitration logic to prioritize cache access among various cache read or write requestors.

While the present invention may be implemented on a vertical multithreaded processor where a memory space, such as L2 cache, is shared by the threads, the invention may also be implemented with a horizontal multithreaded processor where the memory space is not shared by the threads, or with a combination of vertical and horizontal multithreading.

Memory controller 110 may be configured to manage the transfer of data between L2 cache 108 and system memory, for example in response to L2 fill requests and data evictions. In some embodiments, multiple instances of memory controller 110 may be implemented, with each instance configured to control a respective bank of system memory. Memory controller 110 may be configured to interface to any suitable type of system memory, such as Fully Buffered Dual Inline Memory Module, Double Data Rate or Double Data Rate 2 Synchronous Dynamic RAM, or Rambus DRAM, as well as other types of memory, or combinations thereof.

In the illustrated embodiment, processor 100 may be configured to receive data from sources other than system memory. I/O interface 114 may be configured to provide a central interface for such sources to exchange data with cores 102a-h or L2 cache 108 via crossbar 106. In some embodiments, I/O interface 114 may be configured to coordinate DMA transfers of data between network interface 116 or peripheral interface 118 and system memory via memory controller 110. In one embodiment, I/O interface 114 may be configured to couple processor 100 to external boot or service devices.

Peripheral interface 118 may be configured to coordinate data transfer between processor 100 and one or more peripheral devices. Peripheral devices may include storage devices, display devices, multimedia devices, or any other suitable type of peripheral device. Any suitable interface standard or combination of standards may be employed. Examples of standards include Peripheral Component Interface Express, USB, and IEEE 1394.

Network interface 116 may be configured to coordinate data transfer between processor 100 and one or more devices coupled to processor 100 via a network. In one embodiment, network interface 116 may be configured to perform the data processing necessary to implement an Ethernet (IEEE 802.3) networking standard such as Gigabit Ethernet or 10-Gigabit Ethernet, though any suitable networking standard may be implemented. In some embodiments, network interface 116 may be configured to implement multiple discrete network interface ports.

In the illustrated configuration, processor chip 100 has eight cores, each core having four threads, for a total of 32 threads. It should be noted that the invention is not limited to a processor chip with eight cores or cores with four threads.

Various configurations may have more or less than eight cores, and each core may have more or less than four threads, in accordance with the invention. It should also be noted that the invention is not limited to a processor chip in which each core has an exclusive corresponding HR instance, such as an FPU. In a configuration whereby multiple cores share an HR instance, each set of cores that shares an HR instance may be considered as a single core when scheduling threads among the cores. In one such configuration, multiple sets of single-threaded cores may each have a corresponding FPU and conform to techniques of the invention as described herein.

As discussed above, and illustrated by the exploded view of core 102a, any one or more of cores 102a-h may be configured for multithreaded execution. In one embodiment, each of cores 102a-h may be configured to perform fine-grained multithreading, in which each core may select instructions to execute from among a pool of instructions corresponding to multiple threads, such that instructions from different threads may be scheduled adjacently. For example, in a pipelined embodiment of core 102a employing fine-grained multithreading, instructions from different threads of the illustrated threads 122a-d may occupy adjacent pipeline stages, such that instructions from multiple threads may be in various stages of execution during a given core processing cycle.

Figure 2:
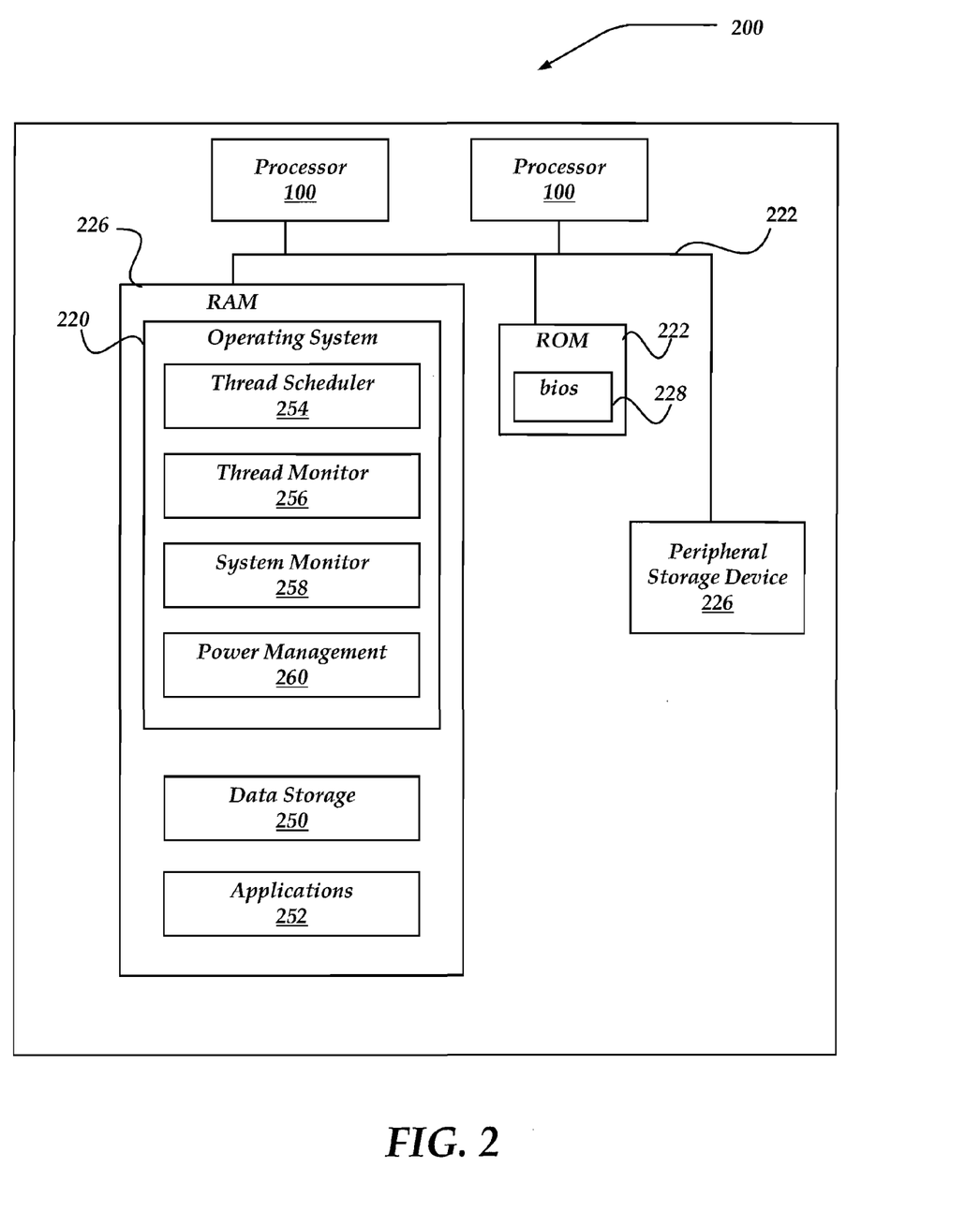
FIG. 2 is a block diagram generally showing one embodiment of a system including a multiple core, multithreaded processor.

One embodiment of a system including processor 100 is illustrated in FIG. 2. System 200 may include more or less components than those shown. The components shown, however, are sufficient to disclose an illustrative embodiment for practicing the invention. In the illustrated embodiment, system 200 may be a computing device that includes two instances of processor 100. Various embodiments of system 200 may include one or more processors 100. Embodiments of system 200 include servers, personal computers, handheld computers, mainframe computers, and other devices that include one or more processors.

System 200 includes processors 100, system memory, and one or more peripheral storage devices 226 all in communication with each other via bus 222. The system memory, in various embodiments, may include RAM 216, ROM 222, and one or more permanent mass storage devices, such as a hard disk drive, tape drive, optical drive, disk arrays, or floppy disk drive. System 200 may communicate with the Internet, or another communications network, using various communication protocols including IP, TCP/IP, UDP, HTTP, WAP, or other protocols.

The system memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The system memory stores operating system 220 for controlling the operation of system 200 and processors 100. Any operating system, including a general-purpose operating system or a special-purpose operating system, may be employed. Basic input/output system ("BIOS") 218 is also provided for controlling the low-level operation of system 200.

Operating system 220 may include a thread scheduler 154, a thread monitor 156, a system monitor 158, and a power management component 160. Thread monitor 156 may include instructions and logic that monitors the status of each thread executing on processors 100 and retrieves data corresponding to the threads, such as thread characteristics. System monitor 158 may include instructions and logic that retrieves and maintains data related to the processor 100, such as performance metrics, component temperatures, power usage, and available power. System monitor 158 may also retrieve and maintain user specifications or system specifications related to power management, as described herein. Thread scheduler 154 may include instructions and logic that assign threads to corresponding cores, and schedules threads to execute on their corresponding cores. Power management component 160 may perform actions, such as sending signals to processor 100, that control power provided to processor 100, each of cores 102a-h, each FPU 130, other hardware resources or hardware components. Power management component 160 may provide power, turn off power, or control a level of power to a component or set of components. Thread scheduler 154 may provide instructions to power management component 160 related to controlling power. Power management component 160 may also control power based on data from processor 100 that result from operations of thread scheduler 154. Thread scheduler 154, thread monitor 156, system monitor 158, and power management component 160 may perform at least some of the methods of the present invention. Operations performed by each of these components in accordance with the present invention are discussed in further detail herein.

Though each of the operating system components illustrated in FIG. 2 are shown as separate components, and operations may be described herein as associated with or performed by a component, the invention is not so limited. Instructions or actions of each component may be combined or distributed in a variety of ways, in various configurations, among each other or additional components. In one configuration, each component includes respective modules of software instructions; however each component may be thought of as a logical component that may be implemented in a variety of configurations. In some configurations, at least a part of the logic of any component may be implemented in a hardware component that may reside on processor 100 or another part of system 200.

The system memory also includes one or more data storage components 150, which may include data used by the operating system 220 or application programs. Data may be stored in RAM 216 or other storage devices, such as a hard disk drive. One or more applications 252 and application components may be loaded into system memory and executed on operating system 220. Examples of application programs may include search programs, schedulers, calendars, database programs, word processing programs, HTTP programs, customizable user interface programs, IPSec applications, encryption programs, security programs, VPN programs, SMS message servers, IM message servers, email servers, web servers, account management and so forth.

Communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Mechanisms described herein act to distribute threads in a multithreaded system in order to manage power consumption and, in particular, to reduce power consumption by the system. Often, the management of power consumption includes considering an actual or potential degradation of performance with respect to one or more threads. There may be a tension between a desire to maximize system performance and a desire to reduce power usage, or maximize power efficiency. Some aspects of the invention include mechanisms that consider one or more factors as part of processes to distribute threads. At least some of these factors are directed to determining a level of performance degradation that may be acceptable when managing power. This may be considered as a tradeoff between optimal performance and optimal power management. Following is a brief discussion of some factors that may be considered as part of a mechanism for power management. These factors are referred to herein as "power management factors." The factors described are not a complete list of power management factors, and other factors may also be included in various embodiments of the invention.

One power management factor is a specification by a system administrator. An administrator may specify an amount of performance degradation that may be acceptable in exchange for maximizing power efficiency of the hardware resources or the system in its entirety. For example an administrator may specify a value in a range that indicates a preference for maximizing performance or maximizing power management. This may be, for example, a value between one and ten, where ten indicates a preference for maximizing performance, one indicates a preference for maximizing power efficiency, and intermediate values indicate the administrator's preference on the scale. An administrator may provide other specifications, such as an allowance of short-term performance degradation, or a variation from a specified average that may be acceptable. The system may also allow an administrator to specify preferences using other mechanisms. The system may include default power management specifications that are used when a system administrator has not provided one or more specifications.

Another power management factor is an amount of power consumption by a processor, one or more cores at issue, hardware resources, other system components of the system, or the system in its entirety. Higher levels of power consumption favor power management and more allowance for performance degradation, while lower power consumption levels may favor less power management. Core temperatures, temperatures of hardware resources, other system components or the system temperature may be another power management factor. Higher temperatures in any one or more of these components or in the environment may favor a higher level of power management and a greater allowance for performance degradation, while lower temperatures may favor less power management. Related to temperature is the available capacity of temperature reduction mechanisms, such as fans or water-cooling systems. A system having temperature reduction mechanisms performing close to their capacity may favor power management more than a system in which the temperature reduction mechanisms are performing much lower than their capacity.

Another power management factor that may be considered is the power source and the status of the power source. A system with power supplied by a battery may favor configurations that increase power efficiency by decreasing power usage, such as distribution 302d of FIG. 3D. In a system with battery power, the total power capacity or the remaining battery strength may be a factor, wherein lower total capacity or lower remaining power strength may favor an even higher preference for mechanisms that increase power efficiency.

The priority of the threads being processed by mechanisms of the invention may be another power management factor. Low priority threads may have more allowance for a degradation of performance, while high priority threads may have a very low allowance for performance degradation. This factor may be considered by embodiments of the invention.

Figure 3A:
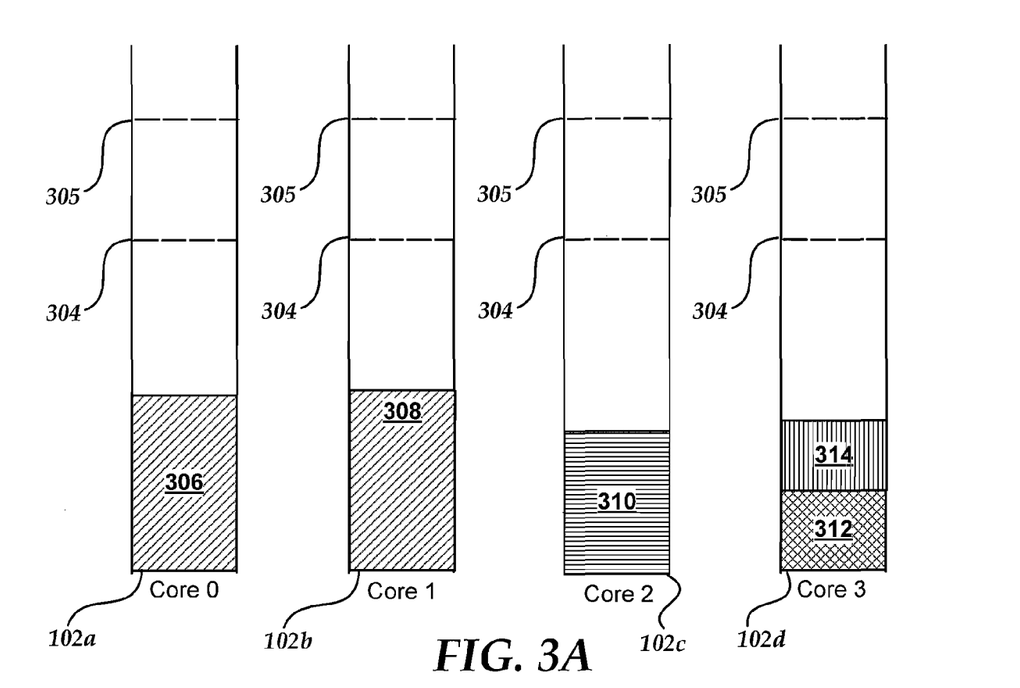
FIGS. 3A-E are diagrams generally showing various distributions of threads among a plurality of cores.

FIGS. 3A-E generally show various distributions of threads among a plurality of cores. FIG. 3A illustrates a first thread distribution 302A, in which the threads are generally evenly distributed across the cores. FIG. 3A illustrates four cores: core 0 (102a), core 1 (102b), core 2 (102c) and core 3 (102d). Though only four cores are illustrated in FIGS. 3A-E, the mechanisms described herein may apply to a system having more or less cores, such as the eight cores illustrated in FIG. 1 or other numbers of cores.

FIG. 3A illustrates threads 306, 308, 310, 312, and 314. Each thread is represented as a rectangular block in which the height of a thread is representative of, and proportional to a hardware resource usage of the thread. In the discussion that follows, a floating point unit associated with the respective core, such as FPU 130 of FIG. 1, may be the hardware resource, though the invention is not so limited, as discussed herein.

The hardware resource usage of a thread may be represented as a fraction of units of hardware resource cycles used per total units of execution cycles. It may be represented as a fraction of hardware resource cycles used per total cycles, including non-execution cycles such as cycles in which memory accesses may occur. It may also be represented as a number of hardware resource cycles per unit of time that the thread is not blocked by contention for processor or other resources with other threads. Hardware resource usage may also be measured as a fraction of instructions directed to the hardware resource per total executed instructions. In any case, the height of a thread as indicated in FIGS. 3A-E is greatest for those threads that use a high hardware resource usage, and lowest for those threads that have a low hardware resource usage. Threads that do not access the hardware resource at all, or that are considered to have a very low usage because they access the resource below a specified minimum usage, are not shown in FIGS. 3A-E. Threads such as 306-314 are referred to herein as hardware resource threads (HR threads). Threads that do not access the hardware resource, or access the resource below a minimum usage, are referred to as non-hardware resource threads. In an embodiment in which the hardware resource is an FPU, these threads are referred to as FPU threads or non-FPU threads, respectively.

It is to be noted that the hardware resource usage of a thread, as illustrated in FIGS. 3A to 3E and discussed herein, is a hardware resource usage as determined by the system or an external component, and is generally an approximate resource usage; actual resource usage may vary at different times. In one embodiment, hardware resource usage of a thread may be determined by sampling. For example, in one embodiment determining hardware resource usage of a thread includes counting a number of clock cycles in which the hardware resource is accessed, and a total number of clock cycles, over a sample period. Thus, in one embodiment, a measurement of hardware resource usage of a thread is based on sampling past behavior of the thread. This may differ from a true past usage or future usage. Determining hardware resource usage is discussed in further detail herein. As used herein, hardware resource usage may refer to measurements or determinations of usage, including, but not limited to, those described herein.

Because hardware usage by a thread may vary from the amounts determined by sampling the thread, it is to be understood that FIGS. 3A-E illustrate approximate usages by each thread. FIGS. 3A-E do not illustrate non-hardware resource threads; however, such threads may also be scheduled on each of the cores in addition to the illustrated thread distribution.

Thus, as illustrated in FIG. 3A, threads 306 and 308 have the highest amount of hardware resource usage, thread 310 has a slightly lower amount, and threads 312 and 314 have a combined hardware resource usage approximately equal to thread 310. FIG. 3A illustrates a distribution of hardware resource usage threads approximately balanced across the four cores 102a-102d. Specifically, thread 306 is scheduled on core 0, thread 308 is scheduled on core 1, thread 310 is scheduled on core 2, and threads 312 and 314 are scheduled on core 3. The term "scheduled" refers to a state in which a thread has been assigned by the operating system to run on a specific core, and may be executing or in a queue waiting to execute on the core. A mechanism that distributes threads in order to produce a result in which threads are approximately balanced across the cores, based on a metric such as hardware resource usage, is referred to herein as a "generic load balancing" mechanism.

FIGS. 3A-3E illustrate a minimal contention line 304 on each core, representative of a minimal contention amount, that indicates an aggregate quantity of hardware resource usage that may be used on the core by multiple threads without significant hardware resource contention and therefore without significantly degrading execution performance of the threads on the core because of the contention. Minimal contention line 304 may represent a level at which one of threads is ready to issue instructions to the hardware resource, but the hardware resource is not ready because it is being used by another thread, or a level in which the number of times that this occurs or the amount of wait times is minimal. The quantity is indicated by the distance between minimal contention line 304 and the base 320 of the corresponding core. This distance is not necessarily on a linear scale, but rather to illustrate relative levels in comparison, such that where the total thread resource usage falls below the minimal contention line 304, there is minimal contention for the hardware resource, and where the total thread resource usage falls above the minimal contention line 304, there is more than minimal contention. The amount indicated by the minimal contention line 304 may be based on the total capacity of the hardware resource, such as the number of clock cycles to perform an instruction, the frequency of the hardware resource, and the like. The minimal contention line 304 is also approximate due to the nature of predicting resource contention, in that actual contention may depend on the specific timings of resource access by each thread. However, it serves as a useful illustration of some mechanisms of the invention.

As illustrated in FIG. 3A, threads 306-314 are distributed among the cores 102a-102d such that the total level of resource usage on each core is sufficiently below the minimal contention line 304 to avoid significant contention for the hardware resource, and thus avoid significant performance degradation. The thread distribution 302A may be a distribution resulting from a policy of balancing resource consumption approximately evenly across all cores 102a-102d.

FIGS. 3A-E also illustrate a maximal contention line 305 on each core, representative of a quantity of hardware resource usage that is likely to cause unacceptable hardware resource contention and therefore unacceptable degradation of execution performance by one or more threads because of the contention. Similarly to the minimal contention line 304, the quantity is indicated by the distance between the maximal contention line 305 and the base 320 of the corresponding core. This scale is not necessarily linear, but serves to illustrate relative levels in comparison. The maximal contention line 305 is equal to or greater than the minimal contention line 304. As illustrated in FIG. 3A, because the total level of resource usage on each core is below the minimal contention line 304, the total level is also below the maximal contention line 305.

The maximal contention line 305 may represent a predetermined amount as specified in a configuration of the system. This amount may be specified by a systems administrator, and indicates an amount of performance degradation that may be acceptable in exchange for a reduction of power usage by the hardware resources or by the system in its entirety. Thus, an administrator who is highly concerned with performance and has low concern for power efficiency may configure the system such that the maximal contention line 305 is close to, or even equal to, the minimal contention line 304. An administrator who is highly concerned with power efficiency, and will accept a reduction in performance in exchange for increased power efficiency, may configure the system such that the maximal contention line 305 is significantly higher than the minimal contention line 304. Various configurations between these two extremes may also be specified. The system may include a default maximal contention line 305 that is used when a systems administrator does not explicitly specify one.

Though a single maximal contention line 305 is illustrated in FIGS. 3A-E, and discussed herein, the invention may include additional specifications to configure performance and power usage. For example, the system may include a long-term maximal contention line (not illustrated) that indicates an acceptable contention amount for longer periods of time, in addition to a short-term maximal contention line that indicates an acceptable contention amount for shorter periods of time. Another contention line may indicate a desired average contention amount, though a higher maximal contention amount may be more of an absolute limit. A specification may also indicate that exceeding a contention line is acceptable in certain situations, such as when low-priority threads are scheduled on a core, when one or more cores are consuming a high amount of power or are running at a high temperature, or based on any one or more of the power management factors described herein.

The system may also include mechanisms that dynamically vary the minimal contention line 304, the maximal contention line 305, or other such specifications. An administrator's specification or a default specification may indicate an acceptable range for the maximal contention amount, and the system may dynamically determine an actual amount based on other factors, such as the power management factors discussed herein. In some embodiments, an administrator's specification or a default specification may be overridden by other power management factors. For example, a core having only or mostly low-priority threads may have a maximal contention amount raised, indicating a greater acceptance of hardware resource contention. Conversely, a thread having high priority threads may lower a contention line. The system may alter a maximal contention amount in response to one or more cores having a high temperature, in order to allow cooling of the core.

In the illustrated embodiment, each of the minimal contention line 304 and the maximal contention line 305 are respectively identical for each core. In one embodiment, in which instances of the hardware resource associated with various cores differ in capacity or quantity on their respective core, the minimal contention line 304 or the maximal contention line 305 on various cores may be different. For example, a first core may have a single FPU, while a second core may have two FPUs. The capacity, and therefore the contention lines, of the second core may therefore be greater than that of the first core.

Figure 3B:
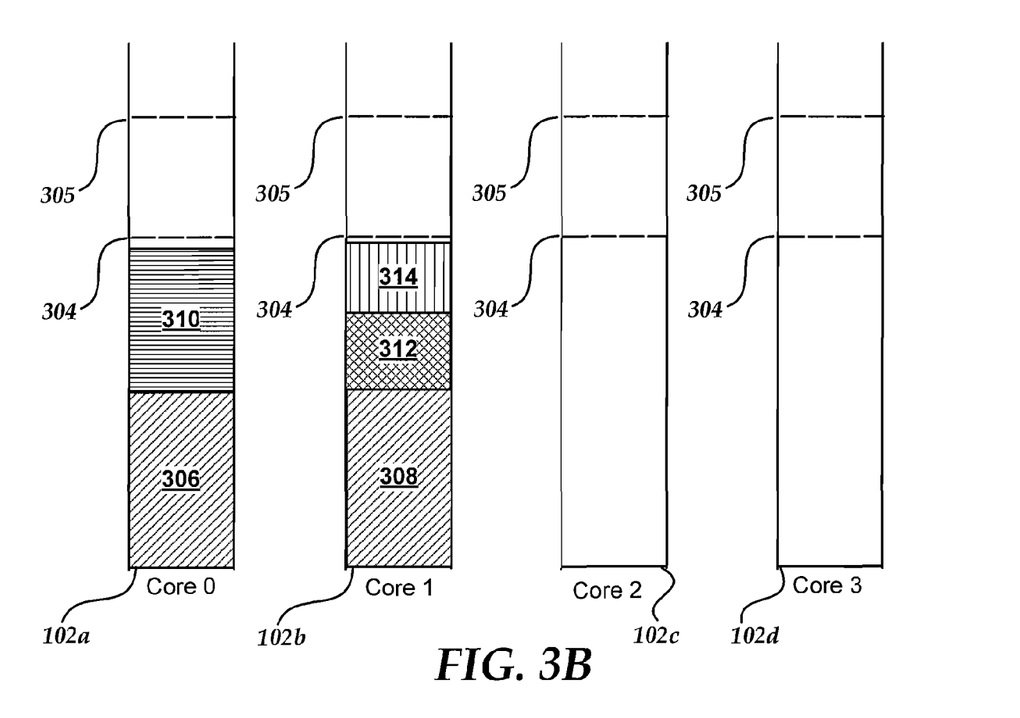

FIG. 3B illustrates a distribution 302b of threads 306-314 across cores 102a-102d that may be generated as a result of employing aspects of the present invention. In FIG. 3B, threads 306 and 310 are scheduled on core 0, and threads 308, 312, and 314 are scheduled on core 1. Cores 2 and 3 do not have hardware resource threads scheduled on them. Threads 306 and 310 may be scheduled on respective hardware threads of core 0. For example, referring to FIG. 1, thread 306 may execute on one of hardware threads 122a-d, while thread 306 executes on a different one of hardware threads 122a-d. Similarly, threads 308, 312, and 314 may each execute on different hardware threads within core 1. As used herein, cores such as cores 0-1 (102a-b) having scheduled hardware resource threads, are referred to as hardware resource active cores, and cores such as cores 2-3 (102c-d) are referred to as hardware resource inactive cores.

In the illustrated distribution 302b, hardware resource threads are coalesced onto a set of one or more hardware resource active cores based on the hardware resource usage of each thread, the minimal contention amount, and the maximal contention amount, such that at least one of the set of cores has multiple hardware resource threads, and such that there is at least one hardware resource inactive core. Specifically, in distribution 302b, five HR threads are coalesced onto two cores, core 0 (102a) having two HR threads and core 1 (102b) having three HR threads, while cores 2 and 3 (102c-d) have no HR threads. As illustrated in FIG. 3B, in the distribution 302b, the total resource usage of threads 306 and 308 on core 0 (102a) is less than the minimal contention amount indicated by minimal contention line 304. The total resource usage of threads 308, 312, and 314 on core 1 (102b) is also less than the minimal contention amount. Thus, contention for the hardware resource, such as the FPU, is zero or minimal for core 0 and core 1. Therefore, there is zero or minimal performance degradation caused by coalescing hardware resource threads onto these two threads.

In the distribution 302b, the hardware resource on core 2 (102c) and core 3 (102d) may be powered down. Powering down a resource, such as an FPU, may be performed by reducing power to zero for the resource, or by reducing the power to a low amount, such that the reduction of power is significant. As discussed herein, a reduction of power to a hardware resource may reduce the temperature of the resource, resulting in less need for cooling mechanisms associated with the resource. The power provided to the associated cooling mechanisms may therefore be partially or completely reduced, thereby saving additional power. In some configurations, the amount of power provided to the hardware resource or the cooling mechanism may be reduced to a minimal amount in order to maintain a stand-by state, in which power can be restored quickly when required. In some configurations, a cooling mechanism may be used with a hardware resource associated with a hardware resource active core, such as core 0 (102a) and a hardware resource associated with hardware resource inactive core, such as core 2 (102c). In this configuration, power provided to the cooling mechanism may be reduced to an amount as required by the combination of hardware resources.

The distribution 302b represents a distribution that may be near optimal for the example threads, in that there is close to the maximal amount of coalescence of threads that can be achieved without causing more than a minimal hardware resource contention. Specifically, cores 0-1 (102a-b) are maximally utilized with respect to hardware resource usage within a constraint of not degrading performance; reducing power to cores 2-3 (102c-d) allows for maximal power management.

As noted above, non-hardware resource threads, or non-FPU threads, are not illustrated in FIG. 3B. However, non-hardware resource threads may be distributed among the cores in addition to the hardware resource threads. In one embodiment, for example, after distributing the hardware resource threads across the hardware resource active cores, non-hardware resource threads may be distributed across the hardware resource active cores and the hardware resource inactive cores. Distribution of the non-hardware resource threads may employ a generic load balancing mechanisms, based on factors other than hardware resource usage. In one embodiment, a mechanism to distribute non-hardware resource threads may favor distribution among hardware resource inactive cores, in order to allow room on the hardware resource active cores for new hardware resource threads.

Figure 3C:
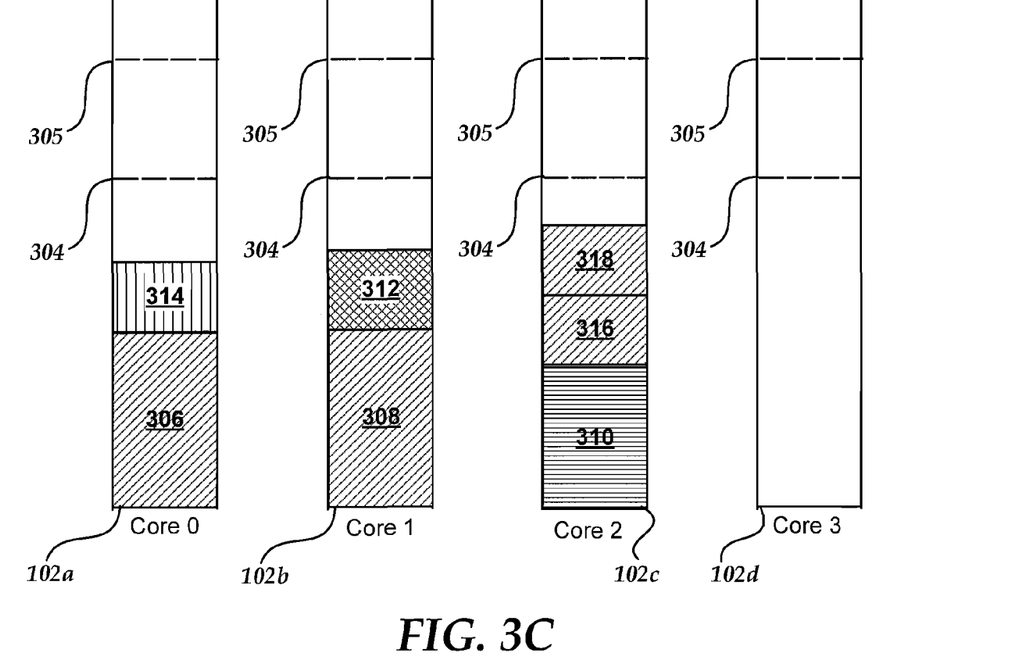

FIG. 3C illustrates a distribution 302c that may result from mechanisms of the invention, in one embodiment. In the distribution 302c, in addition to the hardware resource threads 306, 308, 310, 312, and 314 of FIG. 2, hardware resource threads 316 and 318 are active. The illustrated threads are coalesced onto three cores, cores 0-2 (102a-c), and distributed among the cores 0-2 such that the total hardware resource utilization on each of these cores is below the minimal contention line 304. In the distribution 302c, the hardware resource on core 3 (102d) may be powered down, thereby reducing power consumption.

Figure 3D:
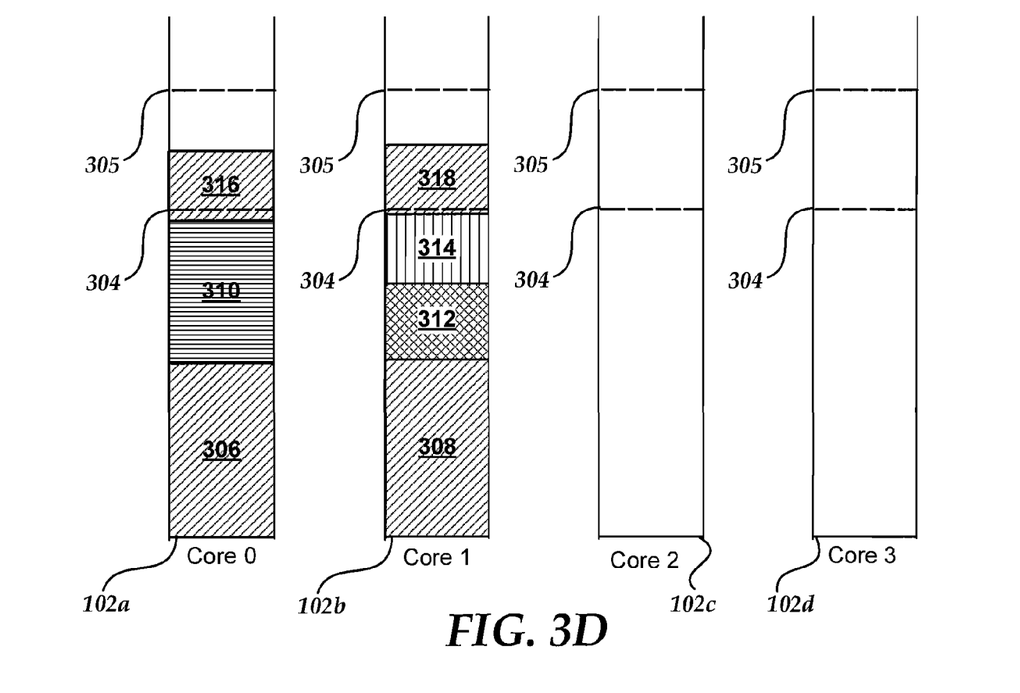

FIG. 3D illustrates a distribution 302d that may result from mechanisms of the invention, in one embodiment. The distribution 302d illustrates the same set of threads 306-318 as illustrated in distribution 302c of FIG. 3C. However, in distribution 302d, the threads are coalesced onto two cores, core 0 (102a) and core 1 (102b), allowing core 2 (102c) and core 3 (102d) to be powered down, reducing power consumption by a greater amount than for the corresponding distribution 302c.

Distributions 302c and 302d illustrate two different distributions that may result from mechanisms of the invention with a similar set of hardware resource threads 306-318. As illustrated in distribution 302d, coalescing all of the illustrated threads onto core 0 (102a) and core 1 (102b) results in a hardware resource utilization exceeding the minimal contention line 304 on each of core 0 and core 1. This may be desirable in some situations, such as one where the system is configured to favor conservation of power over performance degradation, or in which the performance degradation is a low enough level to be deemed acceptable. Distribution 302c may be desirable in some situations, such as one where the system is configured to have a higher amount of importance to avoiding performance degradation than to conserving power. As discussed herein, one or more of a number of factors may be considered by mechanisms of the invention, in order to determine whether to select the distribution of distribution 302c or 302d. For example, a designation of some threads as high priority may indicate that coalescing is to be kept near or below the minimal contention line 304 when possible, and may favor distribution 302c over 302d. Any one or more of the power management factors described herein may be considered in determining a desired distribution.

In addition, some aspects of the invention may favor distributing hardware resource threads to allow for future additional resource usage on a core. The additional resource usage may occur when a thread increases its hardware resource usage, or when a new hardware resource usage thread is added to the system. Allowing for future additional resource usage may avoid or reduce movement of threads between cores, or reduce a startup time for powering up a hardware resource that was powered down. In one embodiment, the system may observe the hardware resource requirements over time, and determine any variations in resource usage. Variations may be considered when distributing threads, for example, by allowing a larger amount of unused hardware resource capacity when the associated threads have a higher amount of variability. Distribution 302c allows for extra unused resource utilization on cores 0-2 (102a-c), which can accommodate new hardware resource threads or an increase in resource usage by one or more threads. Thus, mechanisms of the invention allow for a number of factors to be considered when distributing threads among cores.

In one embodiment, the system may be configured so that in a distribution similar to distribution 302d, power may be maintained to the hardware resource corresponding to core 2 (102c), even when no hardware resource threads are scheduled on it. By maintaining power to core 2, if a situation arises in which a hardware resource thread is to be scheduled on core 2, the hardware resource is ready to execute, and requires minimal, if any, time to start up. The determination of whether to maintain power to the hardware resource of core 2 may be based on any one or more of the power management factors, described herein.

Figure 3E:
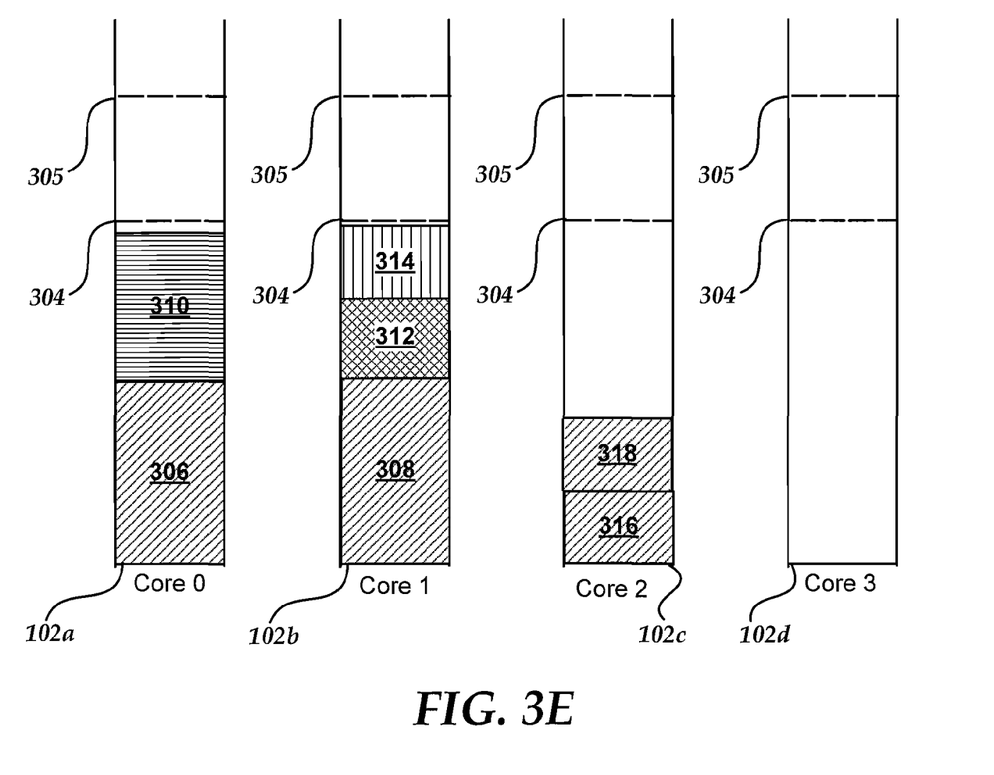

FIG. 3E illustrates another distribution 302e that may result from mechanisms of the invention, in one embodiment. The distribution 302e illustrates the same set of threads 306-318 as illustrated in distributions 302c and 302d of FIGS. 3C and 3D, respectively. However, in distribution 302e, the threads are coalesced onto three cores, cores 1-3 (102a-c) in a configuration that provides a much lower aggregate usage of the hardware resource corresponding to core 2 (102c). An aggregate usage that is approximately one-half or lower may be considered to be much lower. The decreased usage of the hardware resource may allow power to be reduced to the hardware resource, either directly or indirectly by reducing the core or hardware resource frequency. Lowering the frequency may result in lower performance for threads scheduled on core 2, but also may reduce power consumption. In some situations, this may be a desirable configuration. The determination of whether to distribute the threads as in distribution 302e and reduce power to the hardware resource or lower the processor frequency of core 2 may be based on any one or more of the power management factors described herein. In the distribution 302e, if the performance of threads 316 and 318 is dominated by a characteristic other than processor speed or usage of the subject hardware resource, a reduction of performance to threads 316 and 318 may be less consequential, therefore making the power saving distribution 302e more desirable. For example, where threads 316 and 318 have a relatively high latency of memory access, lowering the processor frequency may have a smaller performance effect. Similarly, a high latency of access to another hardware resource other than the subject resource may dominate the performance, making distribution 302e more desirable. Thus, a determination of whether to balance or unbalance threads on a selected subset of cores may be based on an amount of latency of memory access or another resource.

Though the distribution 302e as illustrated shows a total hardware resource usage on each of core 0 and core 1 being at or below the minimal contention line 304, a similar distribution may result with a set of threads such that the hardware resource usage on one or more of core 0 or core 1 is above the minimal contention line 304. In each of distributions 302c, 302d, and 302e, the system coalesces hardware resource threads onto a selected proper subset of cores such that there remain one or more hardware resource inactive cores. In distributions 302c and 302d, the hardware resource threads are balanced approximately equally across the selected subset. In distribution 302e, the hardware resource threads are unbalanced within the selected proper subset, in order to benefit from power savings on a partially used hardware resource corresponding to one of the cores. It should be noted that the distribution 302e as illustrated provides for a new hardware resource thread or an expanded hardware resource usage by an existing thread, without having a delay due to a startup time of the core 2 hardware resource.

Figure 4:
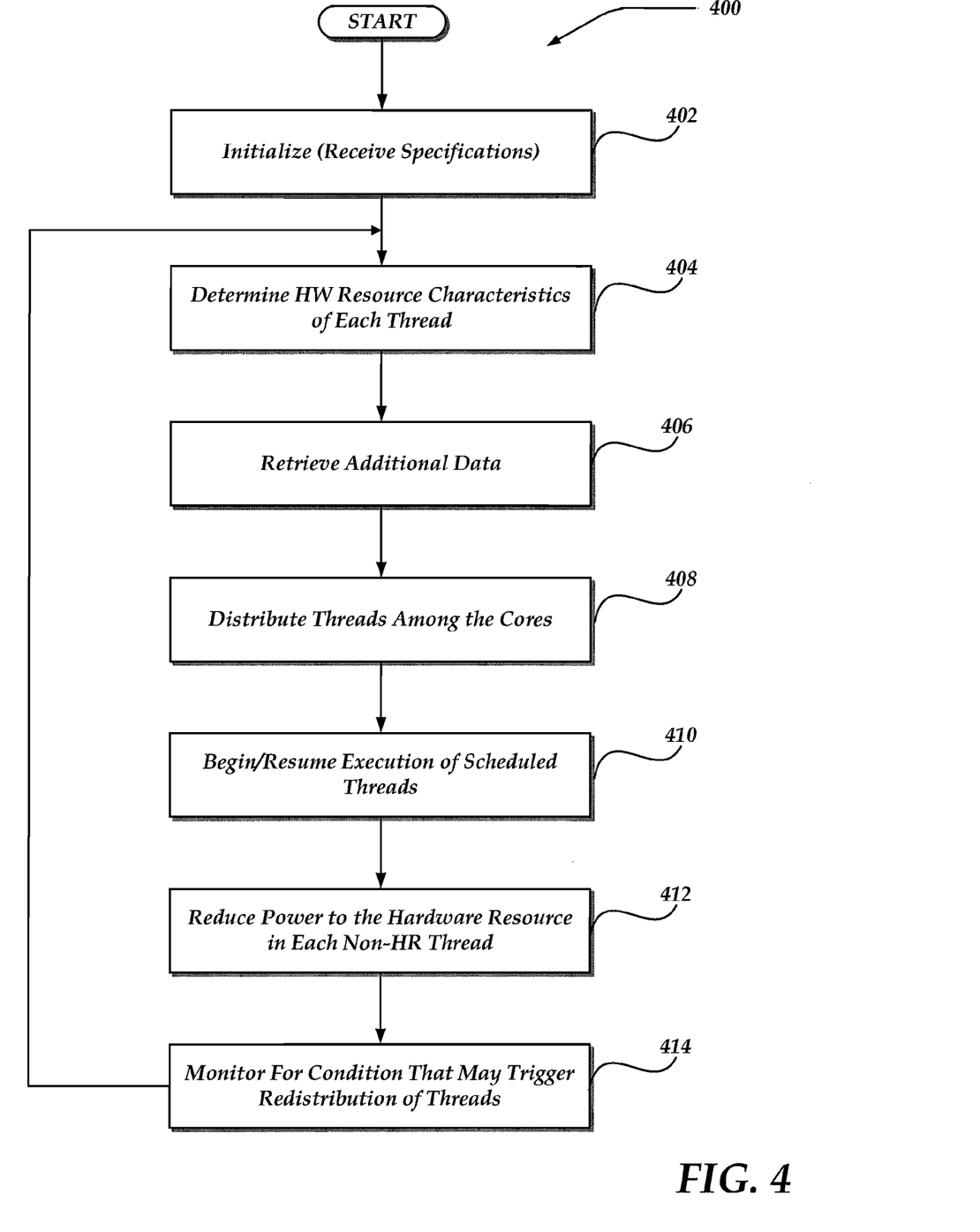
FIG. 4 is a logical flow diagram generally showing one embodiment of a method for distributing threads among a plurality of cores.

FIG. 4 is a logical flow diagram generally showing one embodiment of a process 400 for distributing threads among a plurality of cores. Process 400 may employ the processor 100 of FIG. 1, the operating system 220 of FIG. 2, or portions thereof. The discussion that follows refers to hardware resources. In one embodiment, the hardware resources are floating point units. In some embodiments, the hardware resources may be other types of hardware resources that consume power, or combinations of hardware resources, as discussed herein. In one embodiment, the hardware resource may be a cache memory component. In one embodiment, the hardware resource may be data bandwidth.

Process 400 begins, after a start block, at block 402, where initialization is performed. Initialization may include receiving or retrieving systems specifications or administrator specifications employed during the process 400, as discussed herein. These specifications may include preferences related to power management or performance requirements, or the like, from which a minimal contention amount or a maximal contention amount may be determined. System specifications may include system configuration information, hardware resource capacities or other characteristics, processor capacities or other characteristics, or the like. For example, in an embodiment in which the hardware resource is a floating point unit, the system specifications may include an FPU capacity or speed. The initialization of block 402 may include determining values such as a minimal contention amount, a maximal contention amount, or other thresholds from the various specifications and data.

The process 400 may flow to block 404, where hardware resource (HR) characteristics are determined for each thread. This action may include determining an amount of a hardware resource that is used by each thread, where the amount may be as a fraction of resource units per unit of time, such as HR cycles per instruction cycle, HW instructions per second, or the like. In some embodiments, hardware may provide assistance to software in determining characteristics of a thread. In one embodiment, a hardware performance counter may be used to determine HR characteristics of a thread. The hardware performance counter may provide usage metrics relating to the hardware resource, such as cycles that access the hardware resource during a designated period. During a specified period of time, a hardware performance counter may be incremented for each executing instruction that accesses the hardware resource. For example, in a configuration in which the hardware resource is a floating point unit, a hardware performance counter may count each floating point load or store instruction. A hardware performance counter may also count the total number of instructions that are executed during the same time period. A software component, such as thread monitor 156 of FIG. 1, may use the performance counters by resetting the counters to zero at the beginning of a sampling period and retrieving each counter value at the end of the sampling period. A computation may then calculate the fraction of floating point instructions over the total instructions during the sampling period. A similar process may be performed with respect to instructions that access another type of hardware resource. A sampling process may obtain data for one or more sampling periods, or may vary the length of a sampling period. In various embodiments, the length of sampling periods may be based on the volatility or sensitivity of the characteristics being determined.

One aspect of the invention that may be employed in various embodiments is the use of thread behaviors to predict future behaviors. For example, a determination of hardware resource usage characteristic during a sampling period is used to determine that in future periods, the hardware resource usage will be consistent with the sampling periods.

The process 400 may flow to block 406, where additional system or environment data is retrieved or determined. This data may include data related to any one or more of the power management factors discussed herein, or other factors. This may include temperatures of cores, the system, or other components. The data may include power consumption by cores, cooling mechanisms, the system, or other components. The data may include power supply data, such as remaining battery strength. The data may include thread-specific data, such as a priority of each thread, longevity of each thread, or other dynamic or static thread data.

The process 400 may flow to block 408, where threads are distributed among the cores. This action is described in more detail in FIG. 5 and associated text. Briefly, this action may include coalescing HW resource threads onto a set of HW resource active cores that is less than the entire set of cores. The coalescing may be based on one or more specifications or power resource factors. Actions may include one or more of determining a set of cores that are to be HW resource active cores, determining a distribution of HW resource threads among the HW resource active cores, determining a distribution of non HW resource threads, or scheduling each of the threads on a corresponding core.

The process may flow to block 410, where execution of the scheduled threads is started or resumed. In some configurations, some of the threads may be in some stage of execution on an instruction pipeline, while some threads may be stalled, or some threads may be queued for execution on a core.

The process may flow to block 412, where power is reduced or turned off to one or more hardware resources corresponding to HR inactive cores, such as core 3 (102d) in distribution 3c, or cores 2-3 (102c-d) in distribution 3d. The effected hardware resources may be partially powered down, or shut down. The hardware resources may be adjusted to perform at a lower frequency corresponding to a lower level of power. For example, in distribution 3e of FIG. 3E, the hardware resource (e.g. the FPU) corresponding to core 3 (102d) may be shut down, while core 2 (102c) may be tuned to a lower frequency. The actions of block 412 may include maintaining or increasing power to the hardware resources corresponding to HR active cores, depending on their previous state. Hardware resources that were in a shut down state may be started up if the new distribution results in their corresponding core becoming an HR active core.

The process may flow to block 414, where the system is monitored for a condition that may trigger a redistribution of threads. In various embodiments, one or more of a number of conditions may trigger a redistribution. For example, an increased aggregate HW resource usage on one or more cores, or a level of performance degradation that exceeds desired parameters may trigger a redistribution. Conversely, a decreased aggregate HW resource usage on one or more cores or a performance improvement may trigger a redistribution. Changes in temperature, power usage, thread priority, or any of the power management factors may trigger a redistribution. It is to be noted that a change that triggers a redistribution may be one that is less desirable, such as a performance degradation or temperature increase, or the change may be one that is desirable, such as a performance improvement or temperature decrease. Similarly, a change in thread characteristics, such as HW resource usage, termination or suspension of one or more threads, starting or waking of one or more threads, or the like, may trigger a redistribution operation. In one embodiment, a specified period of time since a previous distribution may trigger a redistribution. A change in the system configuration, such as may result from a component failure or by an operating system action, may trigger a redistribution.

The process may remain performing the actions of block 414 until a condition triggers a redistribution of one or more threads in the system. The process may flow back to block 404, where HW resource characteristics of each thread are determined. Though not illustrated in FIG. 4, an event other than a trigger condition, such as a signal received by the system, may cause the process to flow back to block 404. In some implementations, a trigger condition or other event may cause the process to flow back to block 402, to perform at least some of the initialization actions. Some implementations may include various optimizations that provide for a partial distribution to be performed by evaluating a proper subset of threads or cores. For example, a change in conditions on one core may be resolved by moving one thread from the core to another core with sufficient capacity, or moving a thread in the reverse direction, without performing the complete process described herein.

Though not shown in FIG. 4, in one embodiment, the process 400 may exit from block 414, or any other block, as a result of other events or logic not discussed herein.

In one embodiment, system monitor 158 of FIG. 2 may perform all or a portion of the actions of blocks 402, 406, or 414; thread monitor 156 may perform all or at least a portion of the action of block 404; power manager 160 may perform all or a portion of the actions of block 412, and thread scheduler 154 may perform all or at least a portion of the remaining actions of process 400. In some implementations, actions may be configured in other ways among these components or may be performed by other components. In some embodiments, hardware components on processor 100 may assist the performance of at least some of the actions of process 400.

Figure 5:
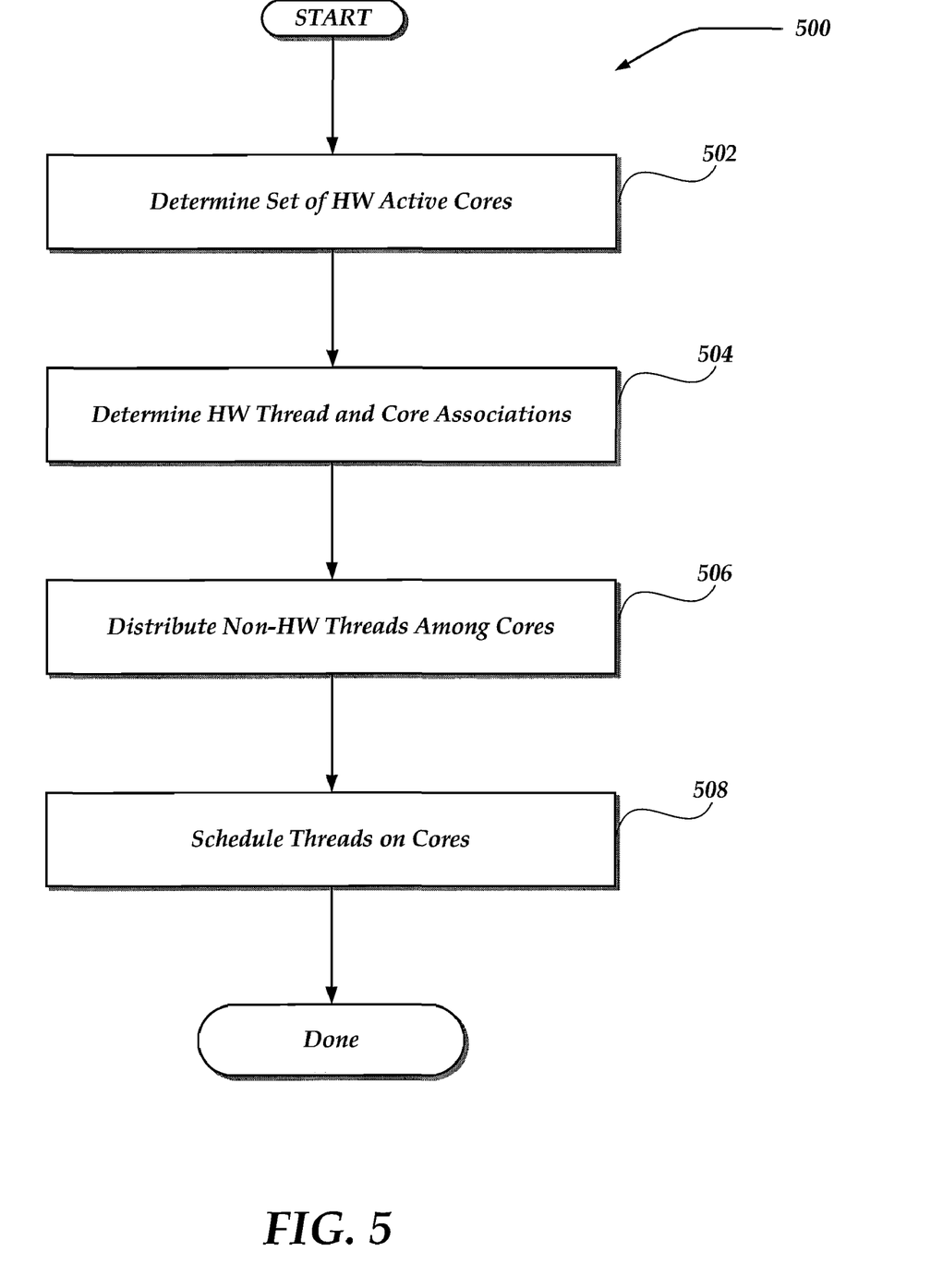
FIG. 5 is a logical flow diagram generally showing, in more detail, one embodiment of a method for distributing threads among a plurality of cores.

FIG. 5 is a logical flow diagram generally showing one embodiment of a process 408 for distributing threads among a plurality of cores. In one embodiment, thread scheduler 154 of FIG. 2 may perform all or at least a portion of the actions of process 408. Process 408 of FIG. 4 illustrates a detailed view of one implementation of block 408 of FIG. 4. Various other implementations may also be used in accordance with the present invention.

At a block 502, a set of HW active cores is determined. This is the set of cores that is to support the HW active threads of the system. In accordance with one aspect of the invention, it is desirable that the set of HW active cores is a proper subset of the system cores, leaving one or more cores as HW inactive cores. The set of HW active cores is the set of cores that is required or desired to execute the HR threads in the system, based on specifications, factors, and logic of the system. For example, referring to the illustrated distributions of FIGS. 3C-E, for the set of threads 306-318, the actions of block 502 may determine that the set of HW active cores is to be either cores 0-2 (102a-c) as illustrated in FIGS. 3C and 3E, or the set of cores 0-1, as illustrated in FIG. 3D. More specifically, in one implementation the actions of block 502 may determine that three cores are to be in the set of HW active cores, and that cores 0-2 (102a-c) are to be the designated cores of the set.

In another implementation, the logic may differ, such as by determining at least some of the specific cores that are to be in the set of HW active cores prior to, or in conjunction with, determining the number of cores that are to be in the set. The latter logic may occur, for example, in an implementation in which it is desirable to minimize movement of threads between cores when redistributing threads.

The determination of the number or set of HW active cores may be based on one or more of a number of specifications or factors. As discussed herein, a specification of a preference for power management or performance, including long-term, short-term, or average specifications, a tolerance of performance degradation, priority of threads, core temperatures or power usage, power source, or any of the power management factors discussed herein, or combination thereof, may affect the determination in block 502. Thus it may be said that the process 408 includes coalescing threads based on one or more of power management specifications or power management factors.

The method may flow to block 504, where HW thread and core associations are determined from among the set of HW active cores. This may be considered to be a distribution of HW threads based on the constraints of the actions of block 502. As can be seen by the differences between distribution 302c of FIG. 3C and distribution 302e of FIG. 3E, for a specific set of HW active cores, a variety of distributions within the set may be determined. In addition to the distributions 302c and 302e, a variety of associations may be determined. For example, in FIG. 3C, threads 306 and 308 may be swapped without significant change to the resource usage of their corresponding cores. Implementations of the process 408 may consider current or previous associations between HW threads and cores, and determine associations in order to minimize movement of threads between cores. Thus, a distribution of HW threads among the set of HW active cores may be based on one or more of power management specifications or power management factors, as described herein.

In some implementations, at least some of the actions of blocks 502 and 504 may be combined. For example, thread distribution logic may temporarily assign HW threads to a set of cores, and rearrange the assignments until a satisfactory set of HW active cores and thread assignments is found. In one implementation, two or more distributions may be determined and then analyzed to determine which distribution to use.

The method may flow to block 506, where non-HW threads are distributed and assigned among the cores. This may include the HW inactive cores as well as the HW active cores. This distribution may employ general load balancing logic, such as approximately evenly balancing the HW threads and non-HW threads among the HW active cores and HW inactive cores. The balancing may be performed based on one or more of a number of factors, such as processor usage, priorities, or the like.

The process 408 may flow to block 508, where each of the threads is scheduled to execute on their respectively assigned cores. It is to be noted that this scheduling may result in a queue for one or more cores, where there are more threads assigned to a core than there are hardware threads supported by the core. Conventional mechanisms for handling such conditions may be employed for this.

The process 408 may flow to a done block, where the method returns to a calling program, such as the process 400 described above.

In some embodiments of the invention, hardware resource usage characteristics may be used to assign threads to processing units to improve thread scheduling for purposes other than power management. In one example, the hardware usage characteristic may be an amount of data bandwidth employed by each thread. Techniques of the invention may be employed to determine such hardware usage characteristics, and to selectively coalesce threads based on these characteristics. For example, threads having low bandwidth usage may be coalesced without significantly degrading their performance due to bandwidth contention.

It will be understood that each block of the flowchart illustrations of FIGS. 4-5, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented method such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for managing threads in a processor having a plurality of multithreaded cores, comprising:
    a processor comprising the plurality of multithreaded cores;
    a system memory comprising a thread monitor;
    the thread monitor, when executing on the processor, is configured to:
        determine a hardware resource usage characteristic of a thread executing on a first core of the plurality of multithreaded cores, wherein the first core comprises a first hardware resource;
    a thread scheduler configured to:

select a subset of the plurality of multithreaded cores as a hardware resource active proper subset, wherein the hardware resource active proper subset comprises a second hardware resource on a second core of the plurality of multithreaded cores and wherein the second core is in the hardware resource active proper subset; and assign, the thread to the second core, in response to a determination that the hardware resource active proper subset does not comprise the first hardware resource and a determination that the hardware resource usage characteristic of the thread will not cause a significant hardware resource contention on the second core, wherein the significant hardware resource contention is caused when an aggregate quantity of hardware resource usage of threads, including the thread, that are running on the second core, exceeds a dynamically selectable hardware resource usage threshold of the second core; and a power manager configured to:
reduce power to the first hardware resource after assigning the thread to the second core.

2. The system of claim 1, wherein the first hardware resource is a floating point unit and the hardware resource usage characteristic is indicative of an amount of floating point usage by the first thread.

3. The system of claim 1,
wherein the first hardware resource and the second hardware resource are each selected from a group consisting of a cache memory, a memory bandwidth, and a data bandwidth, and
wherein the hardware resource usage characteristic is indicative of an amount of usage of the first hardware resource.

4. The system of claim 1, the system further comprising a hardware component that determines an amount of the first hardware resource used by the thread.

5. The processor of claim 1, wherein the power manager is further configured to selectively provide power to a third hardware resource on a third core based on whether the third core is a member of the hardware resource active proper subset.

6. The system of claim 1, wherein the thread is one of a plurality of threads, and wherein:
a) the thread scheduler distributes the plurality of threads so that an aggregate hardware resource usage of at least one core of the hardware resource active proper subset is much lower than an aggregate hardware resource usage of each of a plurality of cores not within the hardware resource active proper subset; and
b) the power manager reduces power to a third hardware resource corresponding to the at least one core.

7. The system of claim 1, further comprising a system monitor that retrieves a user specification of a power management preference, and wherein the thread scheduler sets a number of cores in the hardware resource active proper subset based on the user specification.

8. The system of claim 1, further comprising a system monitor that retrieves at least one power management factor selected from a group consisting of an amount of power consumption by a hardware component of the system, a temperature of a hardware component of the system, an amount of power available to the system, and an amount of available temperature reduction mechanisms on the system, and wherein the thread scheduler determines a number of cores in the hardware resource active proper subset based on the retrieved at least one power management factor.

9. A non-transitory computer readable medium comprising instructions that, when executed, perform a method for managing threads on a system with a processor having a plurality of multithreaded cores, the method comprising:
determining, by a thread monitor, a hardware resource usage characteristic of a first thread executing on a first core of the plurality of multithreaded cores, wherein the first core comprises a first hardware resource;
selecting, by a thread scheduler, a set of the plurality of multithreaded cores as hardware resource active cores, wherein the set comprises a second hardware resource on a second core of the plurality of multithreaded cores and wherein the second core is in the set of hardware resource active cores;
assigning, by the thread scheduler in response to a determination that the set does not comprise the first hardware resource and a determination that the hardware resource usage characteristic of the first thread will not cause a significant hardware resource contention on the second core, the first thread to the second core, wherein the significant hardware resource contention is caused when an aggregate quantity of hardware resource usage of threads, including the thread, that are running on the second core, exceeds a dynamically selectable hardware resource usage threshold of the second core; and
reducing, by a power manager, power provided to the first hardware resource after assigning the thread to the second core.

10. The non-transitory computer readable medium of claim 9, wherein the method further comprises:
determining, by a hardware component that determines, a usage metric related to the second hardware resource.

11. The non-transitory computer readable medium of claim 9, wherein the power manager determines a number of cores in the set based on a user specification of a power management preference.

12. The non-transitory computer readable medium of claim 9, wherein the first hardware resource is a floating point unit, wherein the hardware usage characteristic comprises an amount of the floating point unit used by each thread and at least one performance counter configured to count floating point instructions.

* * * * *